G. W. JACKSON.
LOADING MACHINE.
APPLICATION FILED MAY 29, 1916.

1,313,217.

Patented Aug. 12, 1919.
5 SHEETS—SHEET 1.

Witnesses:
A. S. Barrett
M. G. Ady

Inventor:
George W. Jackson
By William N. Hall
Atty.

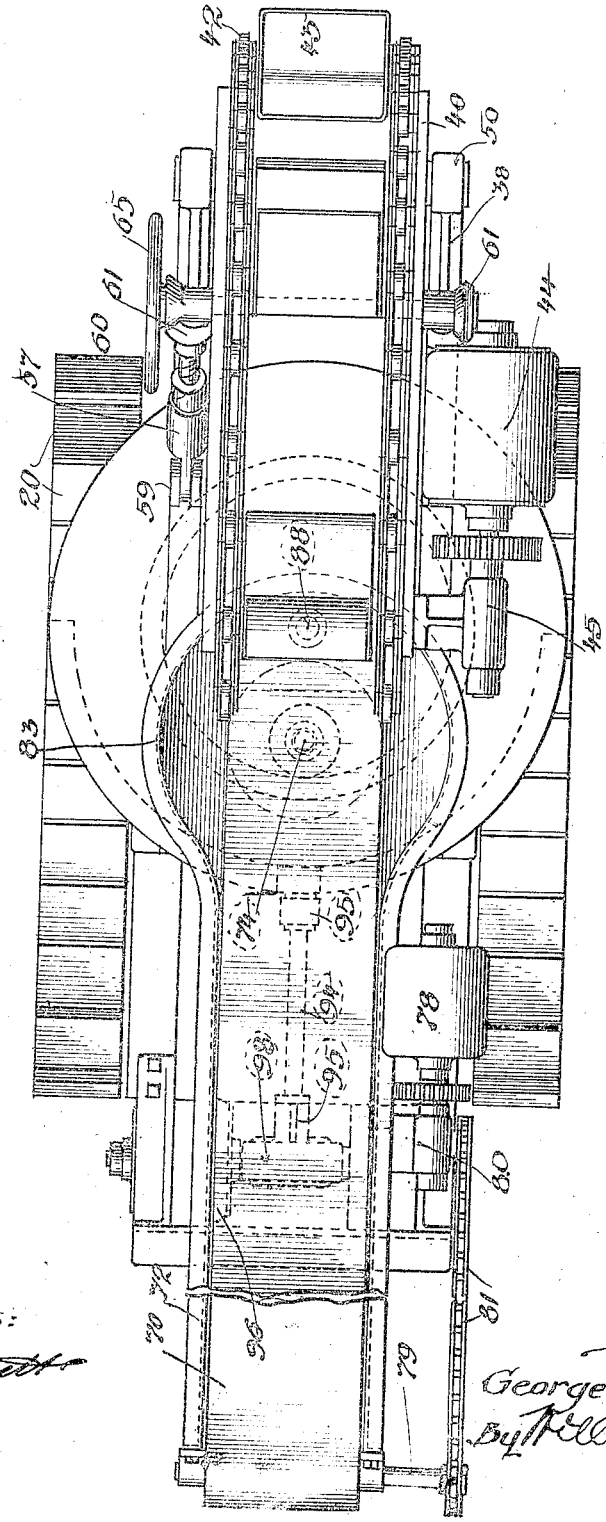

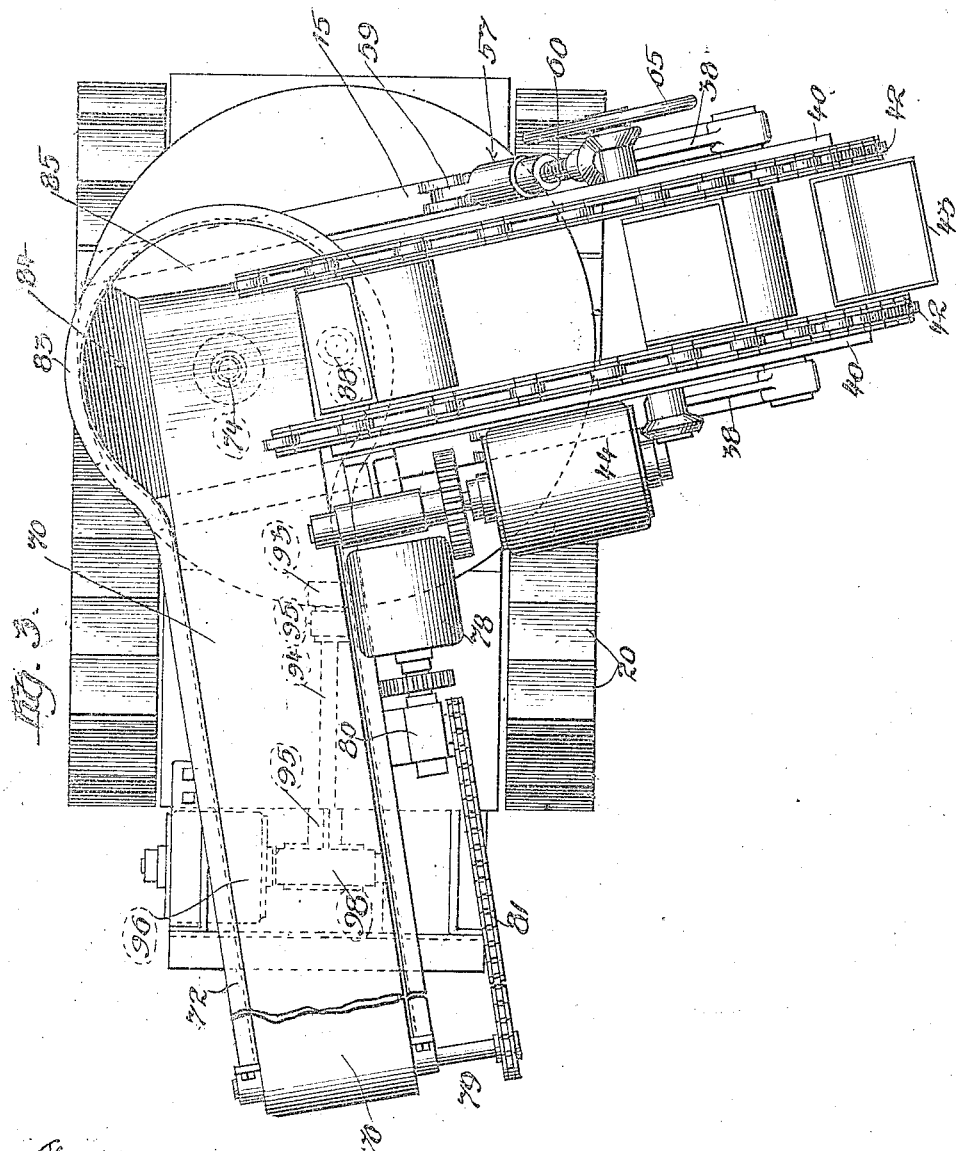

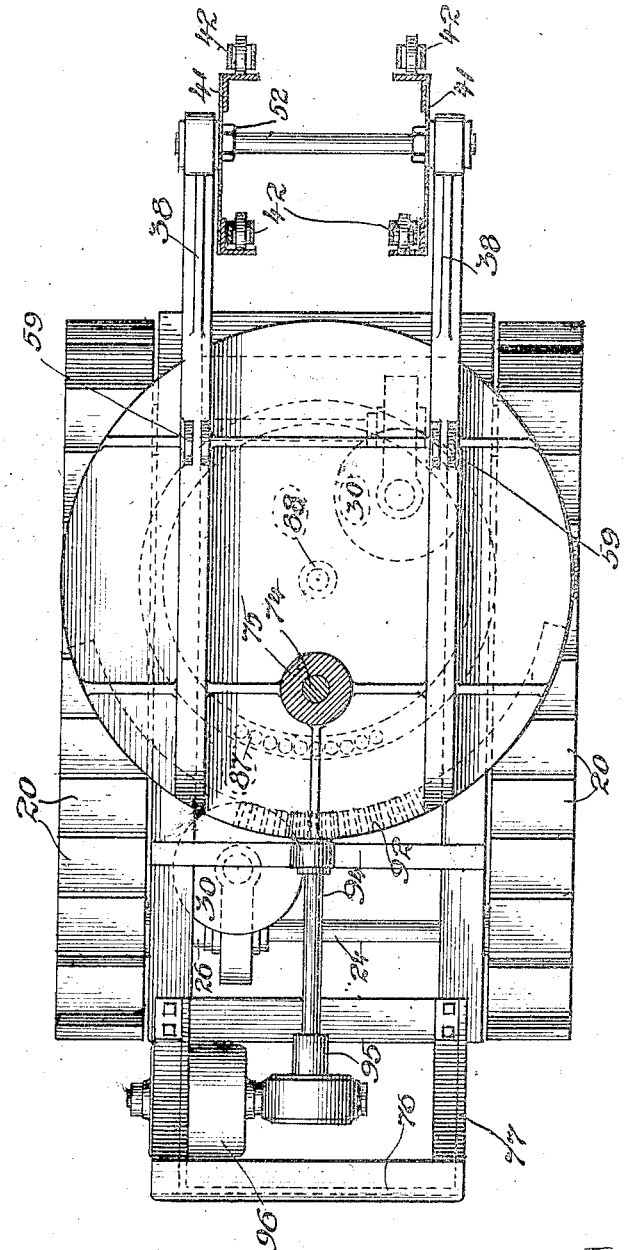

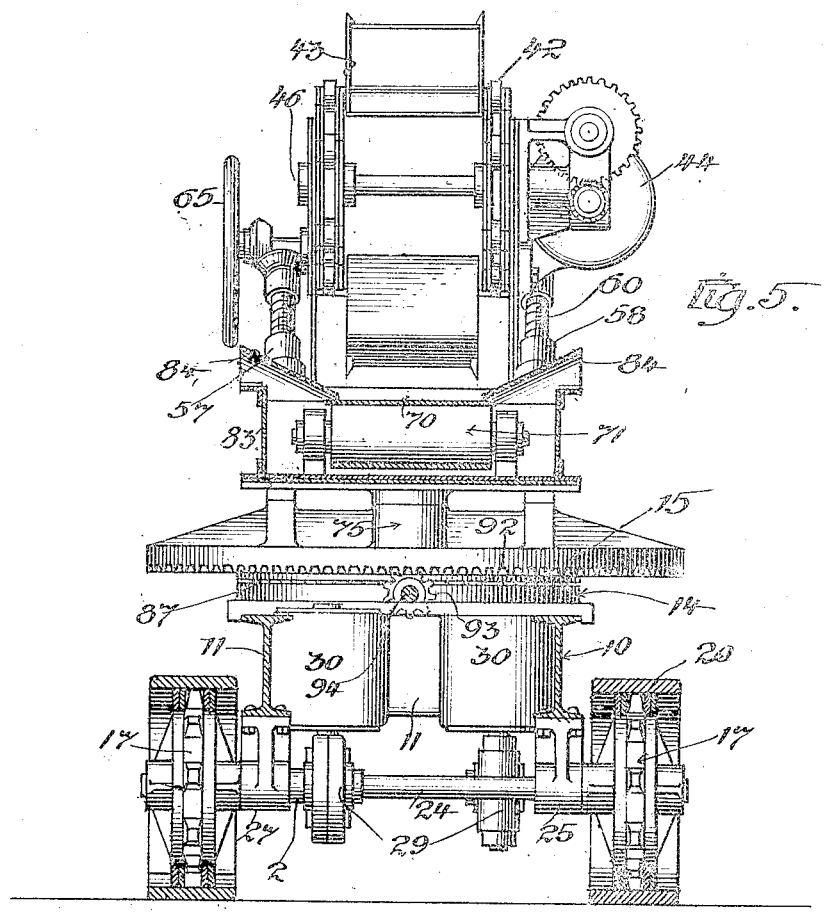
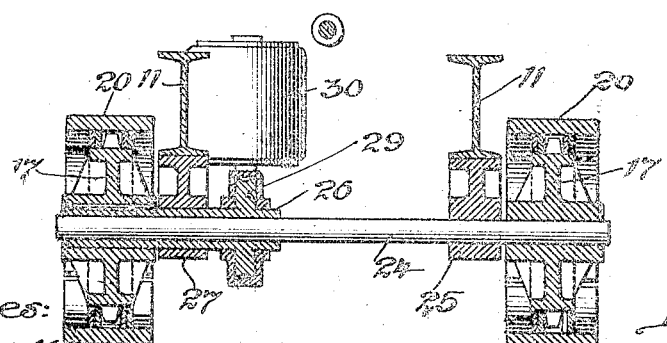

UNITED STATES PATENT OFFICE.

GEORGE W. JACKSON, OF CHICAGO, ILLINOIS, ASSIGNOR, BY MESNE ASSIGNMENTS, TO AMERICAN POWER SHOVEL COMPANY, OF MILWAUKEE, WISCONSIN, A CORPORATION OF WISCONSIN.

LOADING-MACHINE.

1,313,217.      Specification of Letters Patent.      Patented Aug. 12, 1919.

Application filed May 29, 1916. Serial No. 100,548.

*To all whom it may concern:*

Be it known that I, GEORGE W. JACKSON, a citizen of the United States, and a resident of Chicago, in the county of Cook and State of Illinois, have invented certain new and useful Improvements in Loading-Machines; and I do hereby declare that the following is a full, clear, and exact description thereof, reference being had to the accompanying drawings, and to the characters of reference marked thereon, which form a part of this specification.

This invention relates to improvements in loading machines for loading or unloading loose material, such as broken stones produced by blasting in the construction of tunnels, coal, ores, and other such material, and the invention consists in the combination and arrangement of the parts shown in the drawings and described in the specification and is pointed out in the appended claims.

A loading machine embodying my invention embraces, in general terms, a suitable traveling support or carriage which carries a boom that supports an endless series of traveling buckets, which transports the material to be handled from a lower level to a take-off belt in rear thereof at a higher level, by which belt the material is carried to a suitable place for the disposal thereof. The said boom is mounted on the carriage so that its lower or receiving end may be horizontally swung from side to side to increase the arcuate area of its work, the boom being, for this purpose, preferably supported on a turn-table mounted to turn or rotate on the traveling frame or support.

Among the objects of the invention is to provide a novel construction and arrangement of the supporting means for the boom and the take-off belt frame so constructed and arranged as to maintain the discharge end of the boom in such given relation to the receiving end of the take-off belt or carrier and its frame as to insure proper delivery of the material from the discharging buckets to the take-off belt or carrier without the necessity of providing special guiding or directing means therefor. Other objects of the invention are to improve the means for mounting the boom on its swinging frame, and to otherwise improve and simplify loading and unloading machines, as will hereinafter more fully appear.

In the drawings:—

Fig. 2 is a plan view thereof.

Fig. 3 is a view similar to Fig. 2, with the bucket-supporting boom adjusted in a different position.

Fig. 4 is a horizontal section and plan view taken on the line 4—4 of Fig. 1.

Figure 1:
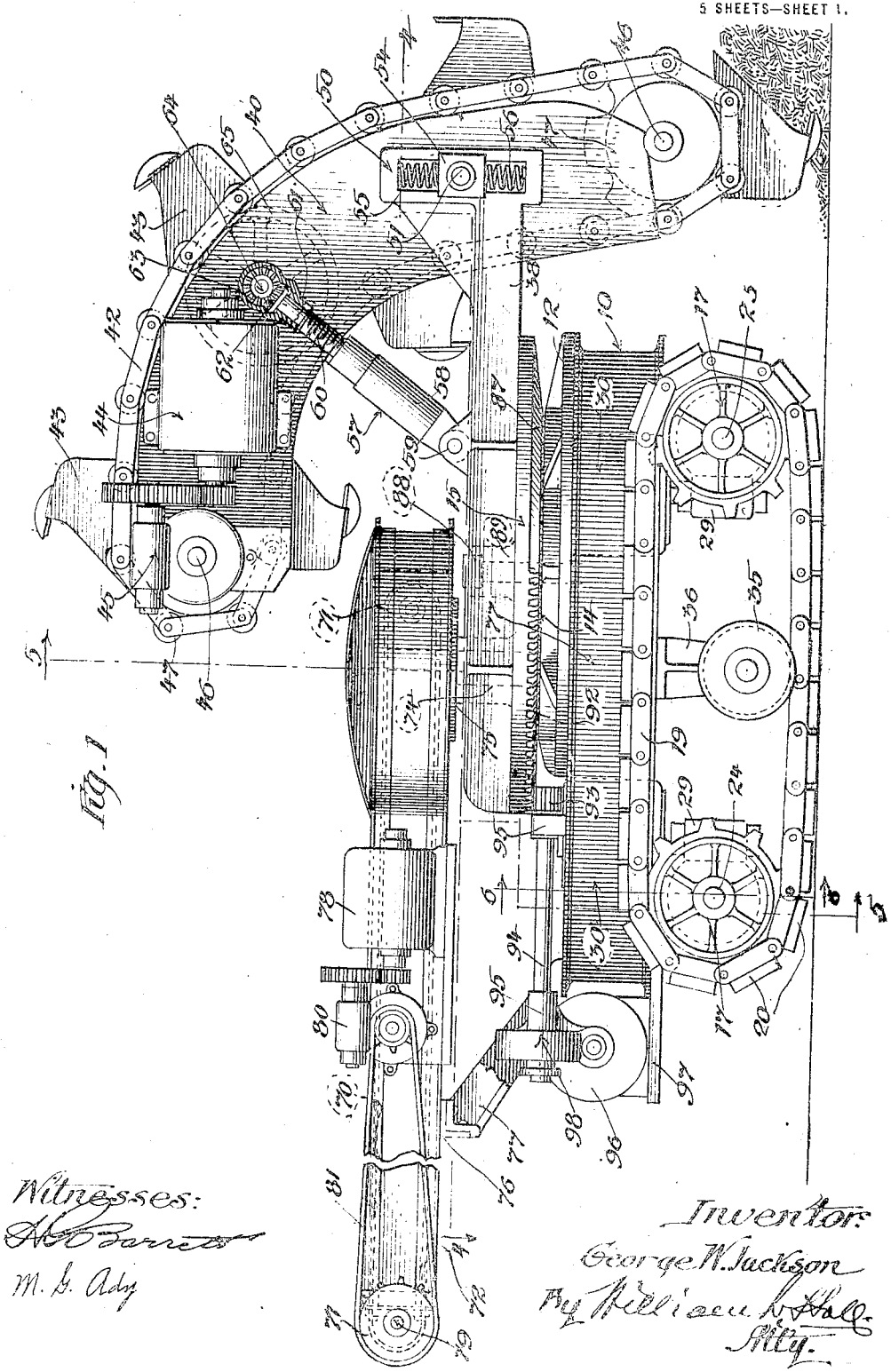
Figure 1 is a side elevation, partially broken away, of a loading machine embodying my invention.

Figs. 5 and 6 are vertical sections taken on the lines 5—5 and 6—6, respectively, of Fig. 1.

The frame or carriage 10 of the machine is herein shown as made of suitably fabricated side and end I-beam members 11 and surmounted by a suitably massive casting 12 which is formed with a central raised seat 14 to constitute a support for a turntable 15, the latter hereinafter being more fully described.

Said carriage 10 is herein shown as supported on and propelled by a caterpillar drive comprising front and rear sprocket wheels or pulleys 17, 17, respectively, about which are trained endless traveling belts or chains 19 that carry the usual facing blocks 20 of a caterpillar drive. The sprocket wheels or pulleys at one side of the machine are fixed, in any suitable manner, to front and rear solid axles 23, 24, respectively, which are rotatively mounted, at one side of the machine, in suitable bearings 25 attached to and depending from the side carriage frame members 11; and said solid axles are rotatively mounted at the other side of the machine in hollow axles 26, which latter are in turn rotatively mounted in bearings 27 carried by the frame, and to which hollow axles the pulleys or sprockets 17 at the latter side of the machine are attached (Figs. 5 and 6).

The solid and hollow axles 24, 26, respectively, are driven through the medium of speed reducing driving gear connections 29, by front and rear motors 30, 30 carried by the carriage frame. Said motors may be either electric, steam or air motors.

The motor which is thus geared to the front solid axle is connected through one of the caterpillar drives with the rear solid axle, and the motor which is geared to the rear hollow axle is likewise connected to the other hollow axle through the other caterpillar drive, so that the two motors may be operated to drive the machine forwardly or rearwardly in straight lines, or to divert the machine from one side to the other, in steering it. Rollers 35, mounted in depending brackets 36, are adapted to bear against the lower laps of the caterpillar drives between the pulleys or sprockets 17 to hold them in effective traction relation against the supporting surface.

The turn-table 15 is provided with forwardly directed arms 38, 38, upon the outer or forward ends of which is supported a bucket-carrying boom 40. Said boom comprises, in general terms, side channeled members 41, 41 on the inwardly directed flanges of which travel endless roller bearing belts 42 which carry buckets 43. Said buckets pick up the material at the lower end of the boom and carry it upwardly along the boom and discharge said material at the upper or rear end thereof. Said endless series of traveling buckets may be driven by any suitable form of motor 44, such as an electric, air or steam motor, which is connected by a suitable reducing gear 45 to one of the shafts 46 that carries the driving and guiding pulleys 47 for the bucket-carrying belts.

The boom is supported on the forward ends of the turn-table arms 38 through the medium of a resilient or cushioning mounting which constitutes, in effect, a shock absorber to absorb shocks and jars brought upon the forward end of the boom when the buckets are brought into contact with the material to be handled or other obstruction. The means herein shown for so mounting the boom on the turn-table arms consists of providing the forward ends of said arms with vertically disposed yokes 50 into which project the ends of a shaft 51 that extends transversely through the boom and is locked thereto in any suitable manner, as by means of the nuts 52 (Fig. 4). The said shaft 51 extends into the yokes midway between their upper and lower ends and is supported by bearing blocks 54 which have suitable guiding engagement in the yokes. Between the upper and lower end walls of the yokes and said bearing blocks are interposed upper and lower springs 55, 56, respectively.

It will thus be seen that the boom is yieldably supported on said arms 38 and that the springs, or equivalent cushioning means which may be employed, serve to absorb shocks and jars in the manner stated, and also relieve the buckets of strains which might tend to break the same or to unduly strain the bucket-carrying belt.

The boom is further supported on the turn-table by means of link connections 57 which are pivoted at their lower ends to lugs 59 extending upwardly from the turn-table. Said links consist of lower tubular members 58 which are internally screw-threaded to receive screw-threaded members 60, which latter are suitably mounted in bearings 61 carried in any suitable manner by the side walls of the boom. To the upper ends of said screw-threaded members are fixed beveled pinions 62 which mesh with other beveled pinions 63 carried by a shaft 64 that extends transversely through the boom and is rotatively mounted in the side walls thereof. One end of said shaft 64 carries a hand wheel 65 by which the shaft may be rotated to turn the screw-threaded members into and out of the sleeve portions of the link connections and thereby elongate or shorten them to effect vertical adjustment of the boom with respect to the turn-table.

70 designates an endless take-off belt which is located in rear of the boom. Said belt is trained about rollers or pulleys 71, 71 that are rotatively mounted at the front and rear ends of a suitable carrier frame 72. The said carrier frame is pivotally connected to the turn-table by means of a trunnion or pivot 74 that extends downwardly from its forward end into a vertical bearing 75 formed on or carried by the turn-table. Said carrier frame is supported in rear of said pivot upon an upstanding supporting bracket 77 which is carried by the rear end of the carriage 10 and extends upwardly and rearwardly therefrom and is formed with a bearing seat 76 on which the carrier frame rests. It will be noted that the take-off belt carrier frame is supported from the carriage by means located below the level of the rear end of the bucket carrying boom, so that the device is self contained, in that the carrier frame is supported on the carriage and said carrier frame support does not add to the over-all height of the machine. The machine is, therefore, compact in height. The take-off belt is driven by any suitable form of motor 78 which is supported on the carrier frame and is operatively connected to the shaft 79 of the rearmost drum or pulley 71 through the medium of a suitable speed-reducing mechanism 80 and a sprocket chain 81. The forward end of the take-off belt frame is enlarged as indicated at 83 in Figs. 2 and 3, and the side and end walls 84, 85, respectively, are inclined downwardly toward the take-off belt 70 so as to prevent the material being handled from falling off of said belt, as will be apparent from an inspection of Figs. 3 and 5.

The turn-table 15 is preferably supported on the turn-table seat 14 through the medium of an annular series of anti-friction bearings 87 (Figs. 1, 4 and 5), said series being disposed concentrically with respect to the axis of rotation of the turn-table. Preferably the turn-table is provided at its turning axis with a king bolt 88 which extends downwardly therefrom into a suitable bearing 89 in the cast metal portion of the carriage frame, and which serves to steady the turn-table and to avoid the same being lifted.

In accordance with the main or principal feature of my invention the take-off belt carrier frame is pivoted to the turn-table eccentrically with respect to the turning axis of said turn-table, as will be clear from an inspection of Figs. 1, 2 and 3. The amount of eccentricity between the pivotal axis of the take-off belt frame and the turning axis of the platform is such as to cause the pivotal axis of the said carrier to travel through a short arc about the turning axis of the turn-table when the table is turned to swing the boom from side to side, so as to cause the receiving end of the carrier frame to follow the discharging positions of the buckets in all the different ranges of adjustment of the boom, as will be apparent from a comparison of Figs. 2 and 3. The connection described is such as to necessitate but small lateral deviation of the rear end of the carrier frame. By reason of the eccentric coupling of the take-off belt carrier frame with respect to the turning axis of the turn-table, the receiving end of said take-off belt carrier frame follows the discharging positions of the buckets in such manner that the take-off belt will always be in position to receive the contents of the buckets without the necessity of supplying some separate or special directing means to direct the material to the take-off belt. The said pivot 74 for the take off belt carrier frame is so disposed with respect to the turning axis of the turn table and with respect to the longitudinal planes of the boom and frame as to be in rear of said turning axis, and in a plane passing through said axis and longitudinally through the boom and frame when the latter occupy the mid positions of their swinging movements. This construction and arrangement permits the machine, as a whole, to be made of a minimum width so as to pass freely through tunnels, mines and like restricted places where it is best adapted for use.

Any suitable means may be employed for rotating the turn-table on its axis to swing the boom from side to side. As herein shown, the turn-table is provided on its under side with an arcuate series of teeth 92 which are engaged by a pinion 93 that is carried by a shaft 94 that is rotatively mounted in suitable bearings 95 in the machine frame. Said shaft 94 is adapted to be rotated by means of a suitable motor 96 which is supported on an extension bracket 97 of the main frame, and is connected to the shaft by any suitable form of speed reducing gear mechanism 98. The arcuate length of said curved series of teeth 92 is such as to enable the boom to be swung approximately ninety degrees from each side of its central position, so that, when using the machine as a means to remove the broken rock from a tunnel breast, said machine may serve a width of tunnel breast, without changing the position of the main carriage, of a width or diameter approximately twice the length of the boom.

The operation of the machine will be apparent from the foregoing description. It may be stated, by way of recapitulation, that the machine is advanced toward the work to bring the buckets at the lower end of the boom into position to lift the material through the medium of its propelling motors 30, and, by reason of the fact that one motor is operatively connected to the tubular axles at one side of the machine and that the other motor is connected to the solid axles at the other side of the machine, said machine may be propelled either forwardly or rearwardly by operating the motors at approximately equal speeds in the same direction, or may be steered from a direct line by operating one of said motors at higher speed than the other, or by operating them in opposite directions. The boom is swung from side to side through a suitable control connected to the motor 96 which acts through the shaft 94 and pinion 95 and the rack or teeth 92 on the turn-table to rotate the latter about its turning axis and thereby to swing the boom from side to side from one limit of its range of movement to the other. The receiving end of the boom is raised and lowered through the operation of the hand wheel 65 which acts, through the shaft 64 and the associated gears, to elongate or shorten the supporting links 58.

It will be understood that the means of maintaining the proper receiving relation of the take-off belt carrier frame to the buckets or other material-elevating means may be effected by other mechanism than that specifically herein shown and described, and that the invention is not limited to the details illustrated except as to the claims wherein such details are specifically set forth.

I claim as my invention:—

1. A loading machine comprising a carriage, a turntable rotatively mounted thereon and provided with an overhanging forwardly projecting boom support, a boom pivoted between its ends to said support and extending at its rear end over said turntable, traveling buckets carried by said boom, a take-off belt in rear of said boom, a carrier frame therefor pivoted to the turntable below the rear end of said boom and eccentric to the turning axis of the turntable and projecting rearwardly beyond said carriage, and means carried by said carriage and located below the level of the rear end of said boom to support the rear end of said carrier frame.

2. A loading machine comprising a carriage, a turntable rotatively mounted thereon and provided with an overhanging forwardly projecting boom support, a boom pivoted between its ends to said support and extending at its rear end over said turntable, traveling buckets carried by said boom, a take-off belt in rear of said boom, a carrier frame therefor pivoted to the turntable below the rear end of said boom and eccentric to the turning axle of the turntable and projecting rearwardly beyond said carriage, and means below the level of said carrier frame and supported on said carriage for supporting the rear end of the carrier frame.

3. A loading machine comprising a carriage, a turntable rotatively mounted thereon and provided with an overhanging forwardly projecting boom support, a boom pivoted to said support to swing vertically and extending at its rear end over said turntable, adjusting means connected to said turntable and connected to said boom at a point between the boom support and the rear end of the boom to hold the boom in different vertical adjustments, traveling buckets carried by said boom, a take-off belt in rear of said boom over said turntable, and a carrier frame therefor pivoted to the turntable eccentric to the turning axis of said turntable and projecting rearwardly beyond said carriage, said take-off belt frame extending at its forward end over the turntable and being formed at its forward end below the rear end of the boom with an enlargement.

4. A loading machine comprising a carriage, front and rear supporting wheels therefor adapted to travel on the same level, a turntable rotatively mounted on a vertical pivot between said front and rear wheels and provided with an overhanging forwardly projecting boom support, a boom pivoted between its ends to said support and extending backwardly over the turntable, a series of traveling buckets carried by said boom, adapted to pick up material from the level on which the supporting wheels travel, a frame pivoted to said turntable eccentric to the turning axis thereof and adapted to swing sidewise on its pivot and disposed with its front end above the turntable and beneath the rear end of the boom and projecting rearwardly beyond the carriage and a traveling take-off belt supported on said frame, the pivot of said frame being so disposed relatively to the turning axis of the turntable and to the boom and frame as to be in rear of said turning axis, and with said pivot and said turning axis in a plane passing longitudinally through said boom and frame when the boom and frame are in their mid-positions.

5. A loading machine comprising a carriage, front and rear supporting wheels therefor adapted to travel on the same level, a vertical pivot on the carriage between said front and rear wheels, a turntable rotatively mounted on said pivot and provided with an overhanging forwardly projecting boom support, a boom carried by said support, a series of traveling buckets carried by said boom, a take-off belt frame pivoted to said turntable eccentric to the turning axis thereof and disposed with its front end above the turntable and beneath the rear end of the boom and projecting rearwardly beyond the carriage and a bracket rising from said carriage to support said frame.

6. A loading machine comprising a carriage, a pivot rising therefrom, a turntable rotatively mounted on said pivot, a boom supported on said turntable and overhanging at its forward end the front end of said carriage and extending at its rear end over said turntable, traveling pick-up devices carried by said boom, a traveling take-off belt, a carrier frame therefor pivoted to said turntable eccentric to the turning axis of the turntable and swingable sidewise about its pivot and actuated in its swinging movement by the rotative movement of said turntable, said frame being disposed with its forward end above said turntable and beneath the rear end of said boom and projecting rearwardly beyond said carriage, and means on said carriage located below the level of the forward end of the carrier frame on which said frame is slidable to support the rear end of said frame from said carriage, the pivot of said frame being in rear of the turning axis of said turntable and in a plane passing through said boom and frame and through said turning axis when the boom and frame are in their mid-positions.

7. A loading machine comprising a carriage, a turn-table pivoted axially thereof and supported on the carrier, a boom supported on said turn-table and extending forwardly therefrom and terminating at its rear end forwardly of the rear side of the turn-table, traveling pick-up devices carried by said boom, a take-off carrier frame pivotally mounted on said turn-table above and forwardly of the rear side of the turn-table with its pivot eccentric to that of the turn-table and with its forward end beneath the rear end of the boom, a carrier supported on said carrier frame, and means extending rearwardly from the carriage for supporting the rear end of the carrier while permitting free lateral or swinging movement thereof from one side to the other of the machine.

In testimony whereof, I have hereunto set my hand at Chicago, Illinois, this 20 day of May, 1916.

GEORGE W. JACKSON.

Witnesses:
 W. L. HALL,
 M. G. ADY.